Nov. 28, 1933. W. B. SCHULTE ET AL 1,937,045
ELECTRIC BATTERY
Filed May 16, 1929
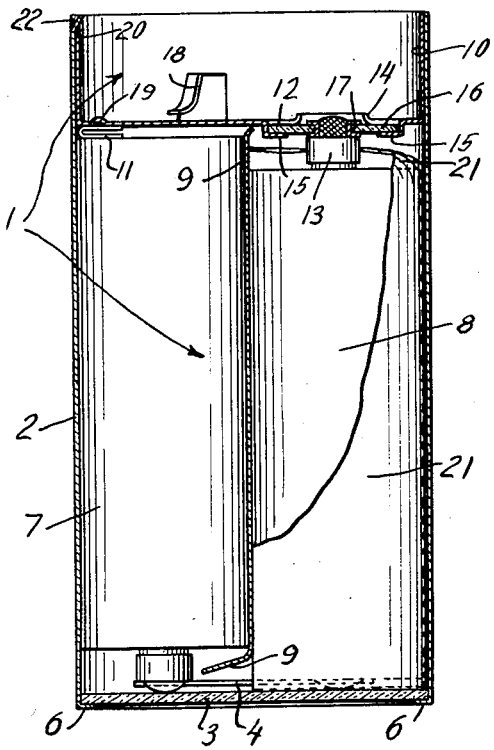
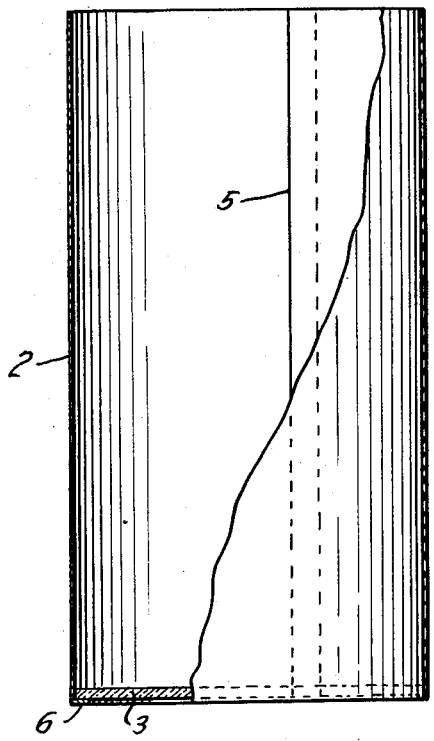
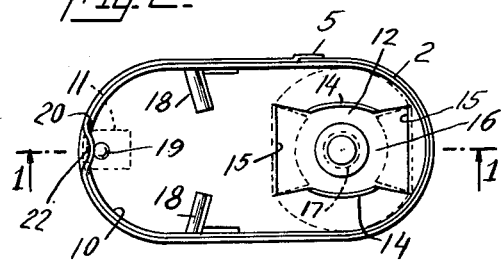
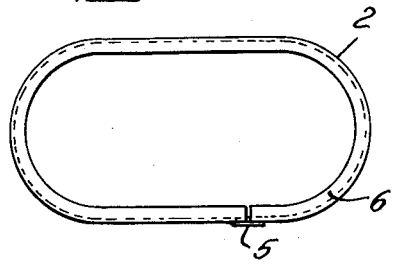
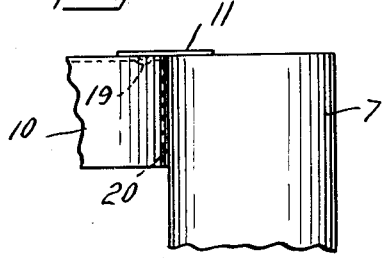
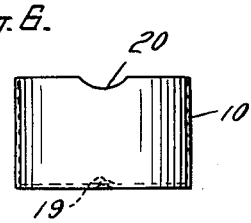
INVENTORS
W.B. Schulte
J. S. Zook
BY
Pennie, Davis, Marvin & Edmonds.
ATTORNEYS Patented Nov. 28, 1933

1,937,045

UNITED STATES PATENT OFFICE 1,937,045

ELECTRIC BATTERY

Walter B. Schulte and John S. Zook, Madison, Wis., assignors to Burgess Battery Company, Madison, Wis., a corporation of Wisconsin Application May 16, 1929. Serial No. 363,450

2 Claims. (Cl. 136—108)

This invention relates to an improved electric battery and specifically to a miniature dry cell battery encased in a metal container. It is of such construction that it may be used in a hand lamp of the type described and claimed in the John S. Zook Patent No. 1,701,093. It is an improvement over the battery shown in that patent.

It is an object of this invention to provide a battery which is easy to assemble, cheap to make, which may be made very attractive in appearance and which is of rugged construction. Other objects will become apparent when the accompanying specification is read in conjunction with the drawing in which:

Fig. 1 is a partial cross sectional elevation along the lines 1—1 of Fig. 2;

Fig. 2 is a top view of the battery;

Fig. 3 is a bottom view of the container;

Fig. 4 is a partial cross sectional elevation of the container;

Fig. 5 illustrates the method of soldering the cup to a cell; and

Fig. 6 illustrates the indentation in the top edge of the cup.

In the form of the invention shown in Figs. 1 and 2 of the drawing a battery unit 1 is enclosed in an open top metal container 2 having an insulating sheet bottom closure 3 preferably made of heavy paper. The bottom of the container may be made of metal similar to the side wall but this metal bottom should have an insulating sheet separating it from the adjacent connecting strip 4. The metal container is made by shaping a flat metal sheet, which preferably has been lithographed previously with appropriate decorative designs, into a flattened-oval shape open-ended tube as shown in Figs. 3 and 4, as by an interlocking crimp at seam 5. The bottom edge of the tube is then turned in or flanged at substantially right angles to form a ledge 6. The insulating sheet bottom closure 3 is then inserted and rests on this ledge to form an open-top metal container. The height of the container above the bottom is about the same as the battery unit to be enclosed therein.

The battery unit 1 which is inserted into the metal container is first assembled independently of the container. In the preferred form, two cylindrical dry cells 7 and 8 are positioned parallel to and laterally adjacent each other along their long axes, the top of one cell being adjacent the bottom of the other cell. A strip of insulating paper 9 is positioned between the two cells as shown. The two cells are held firmly in a jig while the connecting strip 4, preferably of metal, is soldered or otherwise attached to the positive pole of cell 7 and the bottom of the zinc can of cell 8, thereby connecting them in series. A metal cup 10 is then arranged above the series connected cells, the bottom of the cup being electrically connected to the bottom of the zinc can of cell 7. This connection is made, preferably, by soldering a metallic strip 11 to both the cup and the cell. The cup may be soldered directly to the zinc can as shown in the Zook patent. The metallic strip or other flexible metallic conductor is, however, preferable since it facilitates the assembling operation, and its flexibility permits some variation in the length of the component parts. Fig. 5 shows the method of connecting the cup and the bottom of cell 7. The cup is inverted and held firmly immediately adjacent the cell with the bottom of each in the same horizontal plane. The connecting strip 11 is positioned as shown and soldered to the bottoms of the cup and cell. The cup is then turned over into the position above the cells as shown in Fig. 1.

The cup 10 is similar to that shown in the Zook Patent No. 1,701,093 and is used in conjunction with a separable head as described therein. The cup is of a flattened oval shape and is preferably of such size and shape that it forms a snug sliding fit into container 2. An opening 12 of irregular shape in the bottom of one end of the metallic cup 10 allows the positive pole 13 of cell 8 to be exposed therethrough. The side edges of opening 12 are flanged up at 14. Although the cup may be used with the positive pole 13 exposed through opening 12 as described in the Zook patent the construction shown in Figs. 1 and 2 is preferred, such construction being the subject matter of John S. Zook application Serial No. 312,809, filed October 16, 1928 (now Patent No. 1,763,874, granted June 17, 1930). In this prefered construction the ends of opening 12 are flanged downward at 15. A substantially rectangular piece of insulating sheet material 16 is adapted to be arranged in this opening. The member 16 is provided with a perforation 17 into which a metal eyelet may be securely fastened by any suitable means, such as riveting. The insulating sheet 16 is of a width substantially equal to the length of the opening 12 and is adapted to slide sideways into place between flanges 15 and the bottom of cup 10 as shown in Fig. 1. The insulating member 16 with the eyelet mounted therein is so positioned that after the cup 10 is in position at the top of the two series connected cells 7 and 8, the eyelet and hole 17 are directly over pole 13. A drop of fused conducting material, such as solder, is then allowed to run into and fill the hole of the eyelet and run down upon the top surface of pole 13. This provides a permanent electrical connection between the two and makes a rigid battery unit of the cells 7 and 8 and cup 10. The cup 10 also has wings 18 and a lug 19 which are punched in from the sides and bottom respectively of cup 10 for the purposes set forth in the Zook patent. The cup 10 also has an indentation cut out of its upper edge, preferably at 20, as shown in Figs. 1, 2 and 6 and for a purpose to be hereinafter set forth. The cup 10 is therefore one terminal of the battery circuit while the solder and eyelet in opening 17 is the other terminal. The balance of cell 8 may be enclosed by flexible insulating sheet material 21, such as wax paper or tar-lined kraft to prevent contact with the metal container 2 after insertion therein. The insulating wrapper is preferably folded over at the top and bottom of the cell 8 to minimize the possibility of short circuiting. The battery unit 1 is now inserted into the container 2. Since the cup 10, constituting the top of the battery unit, is of the same lateral contour and size as the cross section of the assembled cells and since the cup forms a snug sliding fit into the container 2, the entire battery unit fits slidably and preferably snugly into the container. The top edge of the cup is about flush with the top of the container. After insertion of the battery unit, the top edge of the container is crimped inward at the indented portion of the edge of the cup 10 at the point 20 to form the crimp 22 and thereby lock the battery unit in the metal container.

The above preferred form of battery may be modified in various ways as will be apparent to those skilled in the art. Such variations are within the scope of our invention. The cells may be reversed, that is, the positive pole may contact with the metal cup and the zinc can may contact with the eyelet. Under those conditions it is necessary to insulate both cells from each other and the metal container. When more than two cells are used, the necessary changes in connections and insulation can be readily made by those skilled in the art. A modification of this battery in which four or more cells are used is described and claimed in our copending application Serial No. 363,451, filed May 16, 1929. The insulating sheets 9 and 21 may be omitted if the exterior of can 8 is coated with an insulating material such as "Duco," "Bakelite," insulating enamel, rubber or the like to prevent electrical contact with cell 7 and can 2. Insulating wrapper 21 may also be eliminated by coating the interior of can 2 with an insulating material.

We claim:

1. An electric battery comprising a unit of electrically connected laterally adjacent dry cells and a metal cup mounted at the top of said cells, a flexible metallic connection between the zinc can of the first of said cells and the bottom of said cup, an opening in the bottom of said cup, the positive terminal of said battery projecting into said opening and being insulated from said cup, a sheet metal tube enclosing said cells and cup and conforming to the lateral contour thereof, the bottom edge of said tube being flanged inwardly, a sheet closure resting upon said flange, the top edge of said tube being flush with the top edge of said cup, said cup having an indentation in the top edge, the adjacent edge of said tube being crimped into said indentation to lock the cells and cup into said tube.

2. An electric battery comprising a unit of electrically connected laterally adjacent dry cells and a metal cup mounted at the top of said cells, a flexible metallic connection between the zinc can of the first of said cells and the bottom of said cup, an opening in the bottom of said cup, the positive terminal of said battery projecting into said opening and being insulated from said cup, a sheet metal tube enclosing said cells and cup and conforming to the lateral contour thereof, the bottom edge of said tube being flanged inwardly, a sheet closure resting upon said flange, means upon the top edge of said cup cooperating with means upon the top edge of said tube for locking the cells and cup in position in said tube.

WALTER B. SCHULTE.
JOHN S. ZOOK.